(12) United States Patent
Sadasivam et al.

(10) Patent No.: US 6,636,011 B2
(45) Date of Patent: Oct. 21, 2003

(54) INDUCTION MOTOR CONTROL SYSTEM

(75) Inventors: Vinodkumar Sadasivam, Saint Louis, MO (US); Keith Hoemann, Fenton, MO (US); Bret Clark, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/880,475

(22) Filed: Jun. 13, 2001

(65) Prior Publication Data

US 2002/0190685 A1 Dec. 19, 2002

(51) Int. Cl.[7] ................................................. H02P 1/24
(52) U.S. Cl. ....................... 318/727; 318/729; 318/812; 318/805; 318/798
(58) Field of Search ................................ 318/729, 727, 318/812, 805, 798

(56) References Cited

U.S. PATENT DOCUMENTS

| 4,052,648 | A | 10/1977 | Nola | 318/200 |
|---|---|---|---|---|
| 4,355,274 | A | 10/1982 | Bourbeau | 318/812 |
| 4,420,718 | A | * 12/1983 | Sakai et al. | 318/729 |
| 5,010,287 | A | 4/1991 | Mukai et al. | |
| 5,241,256 | A | 8/1993 | Hatanaka et al. | |
| 5,627,447 | A | 5/1997 | Unsworth et al. | |

FOREIGN PATENT DOCUMENTS

| WO | WO 8706403 | 10/1987 | H02P/7/62 |
|---|---|---|---|

OTHER PUBLICATIONS

PCT/US02/18778 International Search Report mailed Oct. 9, 2002.

* cited by examiner

*Primary Examiner*—Karen Masih
(74) *Attorney, Agent, or Firm*—Howrey Simon Arnold & White LLP

(57) ABSTRACT

An induction motor control system senses the zero-cross angle of a current waveform applied to the motor's phase windings and computes the difference between the sensed current zero-cross angle and a predetermined demand voltage angle to estimate a power factor angle. The estimated power factor angle is compared to a predetermined desired power factor angle, and the voltage applied to the phase windings is adjusted in response to the difference between the estimated power factor angle and the desired power factor angle.

20 Claims, 3 Drawing Sheets

INDUCTION MOTOR CONTROL SYSTEM

BACKGROUND OF THE INVENTION

1. Field of the Invention

The invention relates generally to control of a rotating electric machine, and more specifically, to a load responsive speed regulation device and method for an inverter fed variable speed induction motor drive system based on power factor angle estimation and slip control.

2. Description of Related Art

Many applications for electric motors require variable speed motor operation, and to this end, various speed control solutions have been proposed. Induction motors are popular for several reasons, including high robustness, reliability, low price and high efficiency. A typical induction motor includes a stationary member, or stator, that has a plurality of windings disposed therein. A rotating member, or rotor, is situated within the stator to rotate relative thereto. In a three-phase induction motor, for example, a rotating magnetic field is established by applying three-phase sinusoidal alternating voltages to the stator windings. The rotating magnetic field interacts with the rotor windings to effect rotation of the rotor.

Power conversion systems are commonly used to provide the multiphase AC power to the induction motor for variable speed applications. An example of such a power conversion system is a DC-to-AC inverter bridge, which typically includes inverter switching devices connected in a bridge formation between the DC bus lines and output terminals of the power conversion system. The inverter switching devices are controlled to connect the power on the DC bus lines to the system output terminals in a desired pattern such that AC output signals having the desired frequency and amplitude are synthesized from the DC power on the DC bus lines. Various modulation strategies may be employed for controlling the inverter switching devices to deliver power, including sine wave Pulse-Width Modulation ("PWM").

The desired speeds are achieved by setting the excitation frequency and a corresponding voltage. Low cost speed control solutions are often implemented using constant or schedule based volts-per-hertz algorithms, and speed regulation is based on feedback from a tachometer on the motor shaft. Elimination on the tachometer, however, is desirable not only from a cost perspective, but also for reliability reasons. Processing the speed information from tachometers requires extra signal conditioning circuits and takes up additional input-output pins on the processor chip.

Moreover, an induction motor's speed slips relative to synchronous speed as the load increases. In applications where the load on the motor shaft is varying (for example, a washing machine), it is also important that proper stator voltage be applied to enable efficient operation and avoid over-heating of the motor due to saturation and iron losses. Meeting these requirements requires a load responsive control system that can provide near constant speed operation of the motor and the right amount of the voltage to the stator, thus preventing saturation in the motor core.

Solutions have been proposed for efficient operation of an induction motor based on controlling the power factor of the motor (generally, the power factor is calculated based on the phase difference between the voltage and currents). Such solutions, however, may not be satisfactory in low cost solutions. Additionally, cost effective solutions for a variable speed induction motor drive systems fed by PWM inverter bridges that use simple volts-per-hertz control are not generally available.

The present invention addresses shortcomings associated with the prior art and proposes a low cost solution to achieve the same results.

SUMMARY OF THE INVENTION

The present invention provides a load responsive variable speed induction motor drive system and method based on power factor angle sensing and slip control to maintain speed regulation without the need for a tachometer.

In one aspect of the invention, a method for controlling an induction motor is provided. The induction motor has a rotor and a stator with a plurality of phase windings therein to which AC power is applied to cause rotation of the rotor relative to the stator. The method includes sensing the zero-cross angle of a phase current waveform in the phase windings and computing the difference between the sensed current zero-cross angle and a known stator voltage angle to estimate a power factor angle. The estimated power factor angle is compared to a command power factor angle, and the voltage applied to the motor is adjusted in response to the error between the estimated power factor angle and the command power factor angle. The input frequency may also be adjusted in response to the difference between the estimated power factor angle and the desired power factor angle during certain load conditions to keep speed constant.

In accordance with other aspects of the present invention, an induction motor system includes a stator and a rotor situated relative to the stator to rotate relative to the stator. A plurality of phase windings are situated within the stator, and a power source is connected to the windings to output AC power thereto. In exemplary embodiments, a DC-AC inverter provides the AC power to the motor. A controller is connected to the inverter, and is programmed to compare a sensed current zero-cross angle to a predetermined demand voltage angle to estimate a power factor angle. The voltage, and in some embodiments, the frequency of the voltage applied to the motor are adjusted in response to the difference between the estimated power factor angle and a predetermined desired power factor angle.

BRIEF DESCRIPTION OF THE DRAWINGS

Other objects and advantages of the invention will become apparent upon reading the following detailed description and upon reference to the drawings in which.

Figure 1:
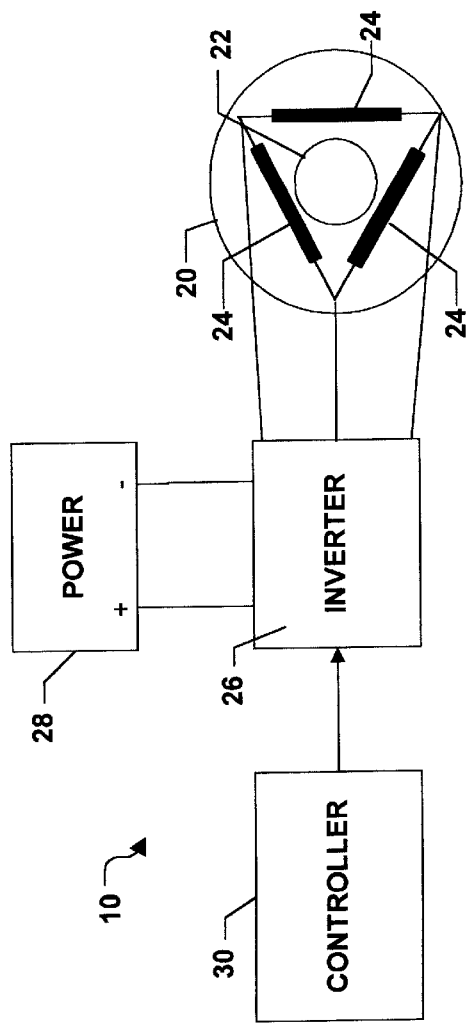
FIG. 1 is a block diagram conceptually illustrating aspects of an induction motor in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A constant slip speed in a motor ensures constant speed of the rotor at a constant input voltage frequency. Maintaining a constant slip also leads to a constant power factor operation. This can be concluded from the equivalent circuit description of an induction motor. Thus, by estimating the power factor of the motor and varying the input voltage to the motor to maintain a constant power factor, a constant rotor slip can be maintained. Consequently, the motor will also have a constant rotor speed.

Rather than calculate the actual power factor by determining both the actual current and voltage phase angles, the power factor angle is estimated by sensing the zero crossing of the phase current of the motor and the command voltage to the inverter bridge powering the motor. FIG. 1 is a block diagram of a rotating electric machine, such as a three-phase induction motor system 10, in accordance with aspects of the present invention. The motor 10 includes a stator 20 and a rotor 22. The stator 20 includes a plurality of windings 24 that receive AC power from an inverter 26. The inverter 26 receives DC power from a power source 28. A controller 30 includes a schedule of voltage and frequency constants, and provides control inputs to the inverter to vary the voltage and frequency to achieve the desired speed. The controller 30 may be implemented, for example, with any type of digital controller such as a digital signal processor (DSP) chip, microcontroller or microprocessor. An example of a suitable controller is a model ADMC328 from Analog Devices.

Figure 2:
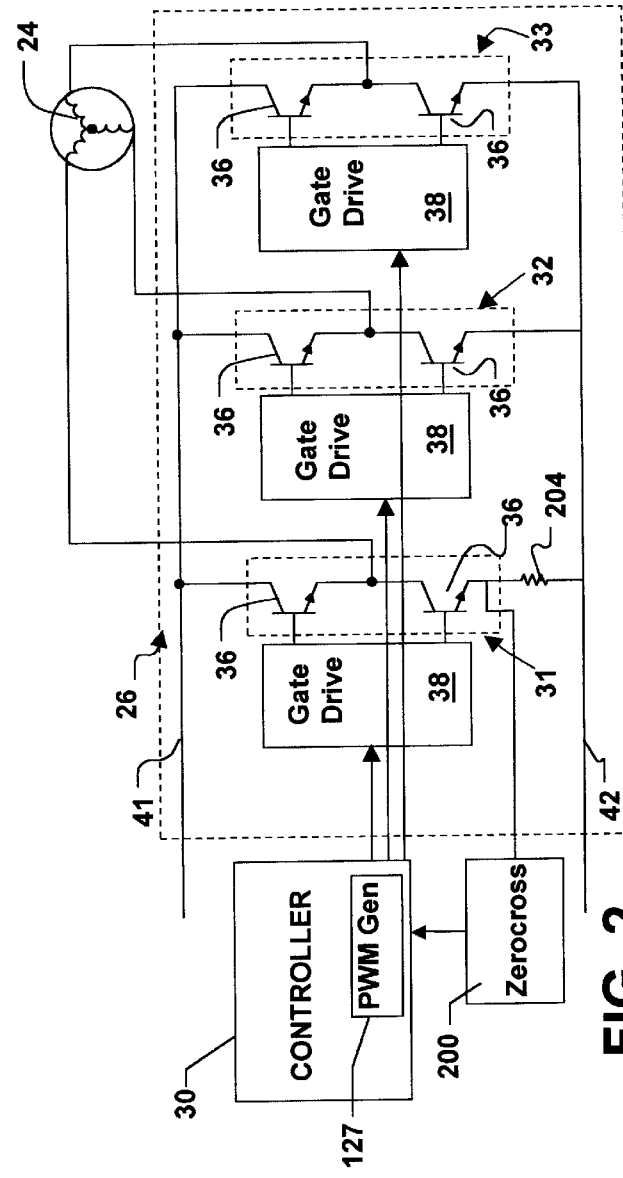
FIG. 2 is a schematic diagram illustrating additional aspects of the inverter shown in FIG. 1.

FIG. 2 illustrates portions of an exemplary inverter 26 in accordance with aspects of the present invention. The exemplary three-phase inverter 26 includes three inverter legs 31,32,33 corresponding to the windings 24 of the three motor phases. Each leg 31,32,33 includes upper and lower switching devices 36 connected in a bridge formation between the positive and negative lines 41,42 of the DC bus. The switching devices 36 may comprise any suitable switching device, such as bi-polar devices, power MOSFETs, IGBTs, etc.

The switching devices 36 of the three inverter legs 31,32,33 are driven by corresponding gate drivers 38 so as to connect the power on the DC bus lines 41,42 to the motor windings 24 in a desired pattern, such that AC output signals having the desired frequency and magnitude are synthesized from the DC power on the DC bus lines 41,42. In certain embodiments of the invention, PWM schemes are used for controlling the inverter switching devices 36. In the illustrated embodiment, the gate drivers 38 have inputs connected to receive the output of a PWM generator 127 implemented by the controller 30.

In known induction motor drive systems, a tachometer would typically provide an indication of the actual motor speed to the controller 30, which would compare the actual speed to a desired speed value and adjust the inputs to the motor windings 24 accordingly. However, in accordance with the present invention, the motor power factor is estimated by calculating the difference between a voltage phase angle and the phase current zero-cross angle to adjust the voltage and frequency constants, and thus, the magnitude of the voltage and the frequency applied to the motor 20.

Figure 3:
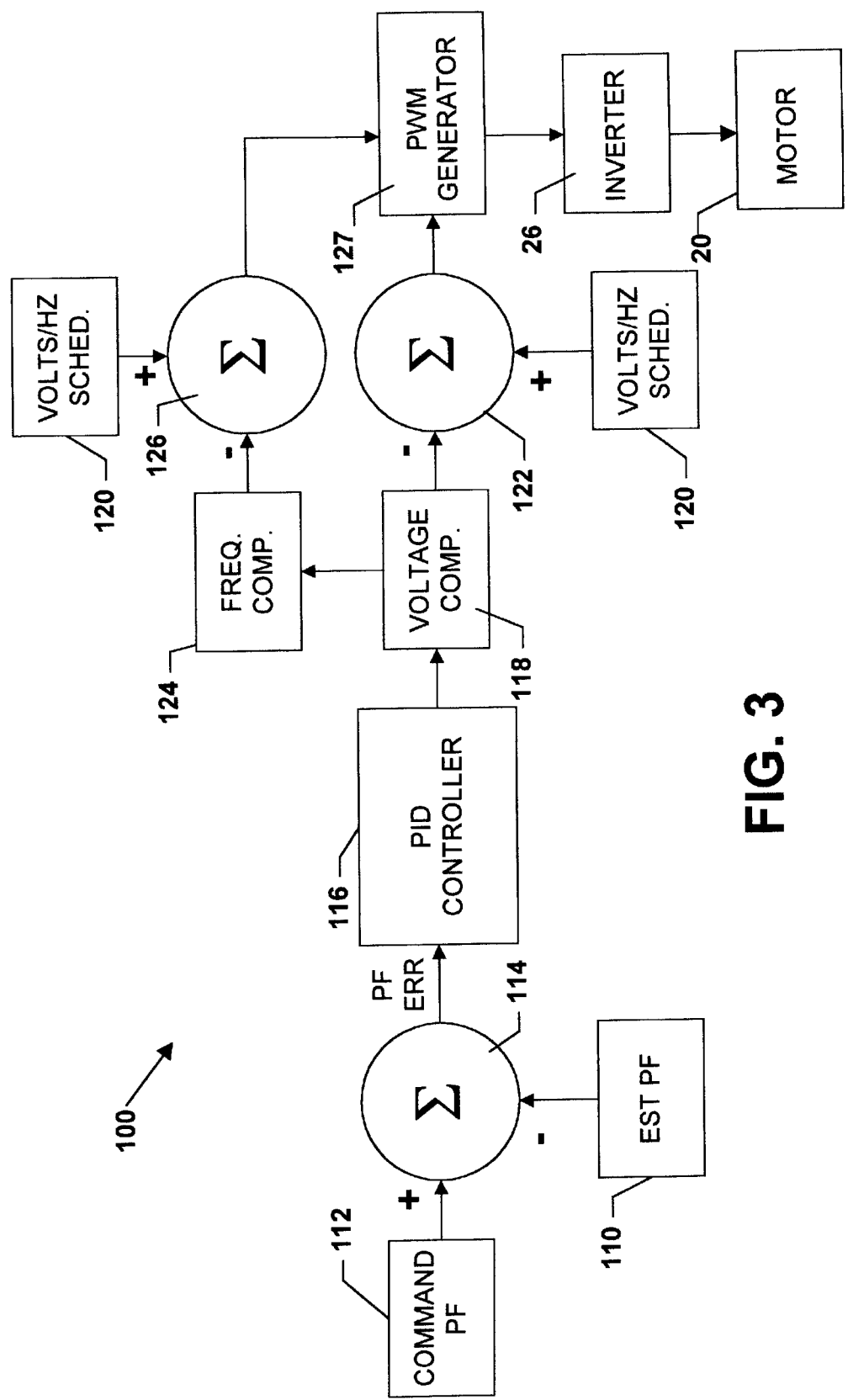
FIG. 3 is a block diagram illustrating a speed control system in accordance with an embodiment of the present invention.

FIG. 3 is a block diagram illustrating a speed control system 100 in accordance with aspects of the present invention. In exemplary embodiments of the invention, this is implemented digitally in the controller 30. The estimated, or computed power factor angle 110 and a desired or command power factor angle 112 are input to a summing junction 114, which outputs a power factor angle error value to a controller 116, such as a proportional-integral-derivative (PID) controller. In certain embodiments, the estimated power factor angle 110 is low pass filtered to increase noise immunity. The controller 116 converts the power factor error value to a voltage compensation value 118, which may be limited to an upper and a lower limit to avoid saturation of output. This range is established so as to handle the expected load changes on the motor 20. The voltage compensation 118 is also low pass filtered in exemplary embodiments of the invention.

The voltage compensation 118 is negated with the original command voltage computed from the motor's constant volts per hertz schedule 120 at a summing junction 122. The voltage schedule 120 is derived based on motor design parameters in a known manner. The summing junction 122 outputs the corrected voltage that is applied to the PWM generator 127. The PWM 127 generator generates switching signals that are applied to the switches 36 of the inverter 26. In this manner, the power factor angle is regulated to a command angle by varying the terminal voltage to the motor 20.

By varying the magnitude of the voltage applied to the motor windings 24 to maintain constant power factor, the slip and thus the speed of the motor 20 is regulated to a near constant value. Based on the voltage compensation 118, input frequency may also be varied to provide additional speed regulation at certain load conditions. The input frequency to the motor 20 is increased for all positive errors fed into the controller 116 and decreased for all the negative errors. Hence, at light loads the input frequency to the motor will decrease enough to provide constant speed operation of the motor. The voltage compensation 118 is converted to a frequency compensation value 124, for example, by applying a gain factor thereto. The frequency compensation 124 is applied to the input frequency in a summing junction 126 to provide an adjusted frequency to the motor 20.

The frequency adjustment at certain load conditions is effective in further regulating the speed of the motor 20. Thus, for a configured load point, near zero speed regulation is achieved for load variations on the motor shaft. Moreover, in further embodiments of the invention, the frequency and voltage inputs may be compensated for temperature variations. Temperature of the motor may be estimated, for example, by measuring the stator resistance. Stator resistance is estimated by applying DC voltages to the motor phases for short intervals of time. Based on the estimated stator resistance, voltage and frequency compensation is calculated and applied to the motor.

To calculate the estimated power factor 110, the current zero-cross instants are determined using a zero-cross detection circuit 200. Referring to FIG. 2, a resistor 204 is included between the lower switching device 36 of one of the inverter leg 31 and the negative DC bus 42. Using a single inverter leg, such as inverter leg 31, to determine the zero-cross angle greatly simplifies the circuitry required to implement the current zero-cross detection, though any or all of the inverter legs 31,32,33 may be used for the zero crossing detection. The current zero crossing is determined by the zero-cross detection circuit 200, then provided to the controller 30 to calculate the power factor angle. In this implementation scheme a level change in the signal is used to signify the zero cross of the phase current, though other schemes for detecting the zero crossing are contemplated, such as through use of the PWM signals.

Figure 4:
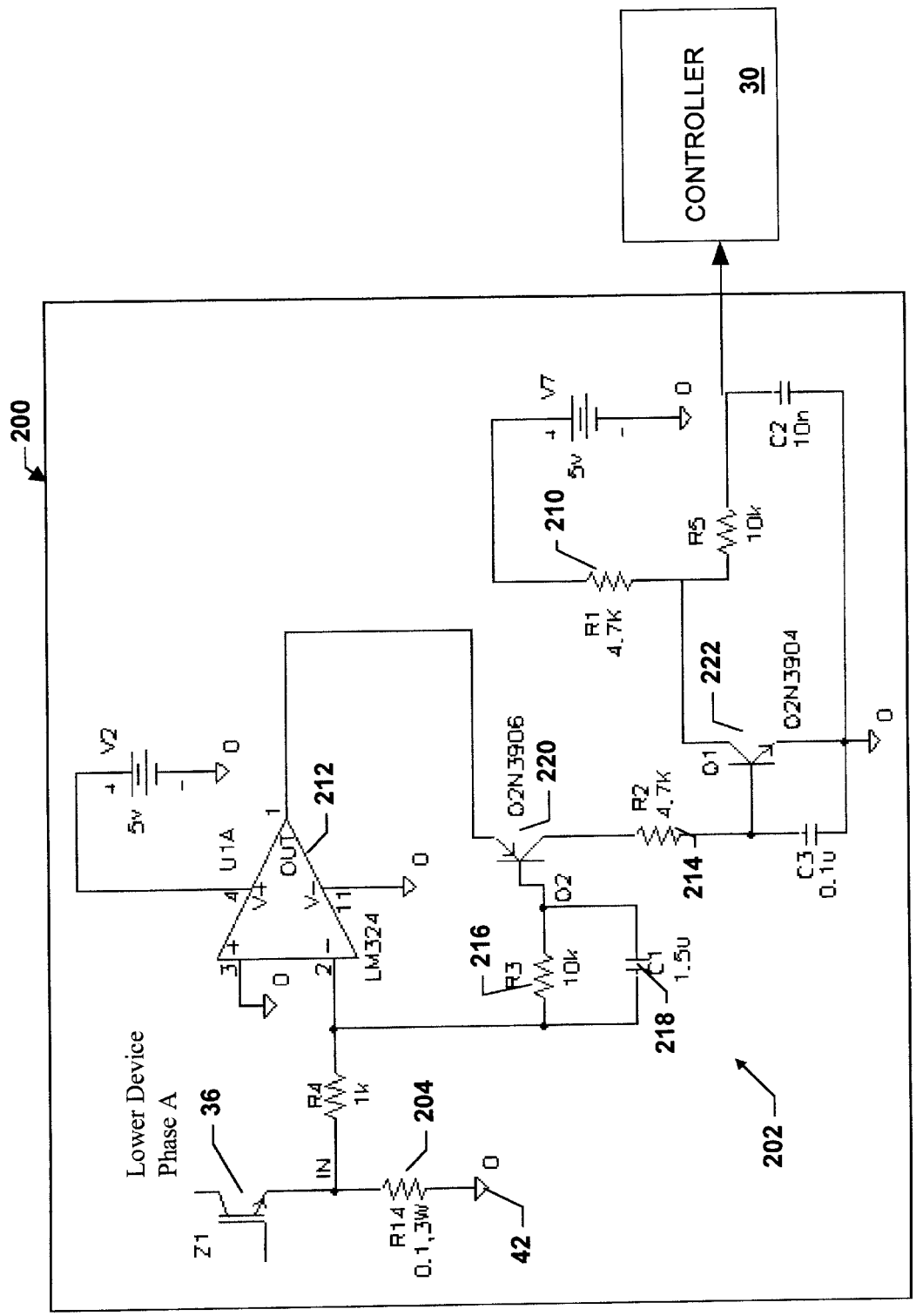
FIG. 4 is a schematic diagram illustrating a phase current zero-cross angle detection circuit in accordance with an embodiment of the invention.

FIG. 4 is a schematic diagram of a zero-cross detection circuit 200 in accordance with an embodiment of the present invention. As noted above, the resistor 204 is included between the lower switching device 36 of one of the inverter legs 31,32,33 and the negative DC bus 42. For sake of simplicity, the first inverter leg 31 is referenced in this description, though any of the inverter legs 31,32,33 could be used for this purpose.

The signal obtained from the resistor 204 is fed to conditioning circuitry 202 that produces a square wave type output signal based on the zero crossing of the phase current. The output is connected to the controller 30. In one embodiment, the output is connected to a level sensitive interrupt pin on the DSP implementing the controller 30, providing an output edge to the DSP each time the current crosses zero. The phase angle is stored in the DSP memory when interrupted. To increase the noise immunity in one embodiment, the interrupt is enabled only for 60° before and after the zero crossing of the phase command voltage. This window of operation works effectively for most of the practical working conditions of the drive system.

The conditioning circuitry 202 functions by converting the current flowing in the inverter phase leg 31 to a voltage signal using the current shunt resistor 204. The first step in processing the signal is to buffer the signal from the resistor 204 and remove the high frequency PWM switching noise. In the illustrated circuit 202, this is accomplished using an operational amplifier 212, two resistors 214, 216, and a capacitor 218 in an inverting opamp filter configuration. A PNP transistor 220 is inserted in the feedback path of the opamp 212 to differentiate between the positive portion of the phase current and the negative portion of the phase current. This is accomplished using the inherent base emitter diode in the PNP transistor 220. When the voltage across the current shunt resistor 204 becomes positive, the voltage at the output of the opamp 212 is pulled down which turns off the transistor 220. Alternatively, when the voltage across the current shunt resistor 204 becomes negative, the transistor 220 is turned on.

An NPN transistor 222 translates the current flowing in the transistor 220 into a logic level voltage signal, which can be read by the controller 30. When the PNP transistor 220 is ON, current flows in the base of transistor 222, which turns it ON and produces a low-level signal at the input of the controller 30. When transistor 220 is OFF, transistor 222 turns off which produces a high level signal at the input of the controller 30. The final result of the circuit 202 is to turn the bipolar sinusoidal current waveform following in the shunt resistor 204 into a logic level signal with transitions at the current zero crossing points.

Estimation of power factor angle is the second step in implementing this algorithm. By definition, the power factor angle is the phase difference between the phase current and terminal voltage of the motor. Since the PWM algorithm accurately reproduces the commanded voltage, the generated phase angle in the controller is used in this computation. By using the voltage phase angle and the sensed zero crossing instant of the current, the power factor angle can be computed. Once the zero-cross angle of the current is sensed, the difference between this angle and the zero-cross angle of the voltage is computed to get the power factor angle. This power factor angle is low pass filtered to increase noise immunity and to avoid sudden changes in the command voltage of the motor. The filtering may be done by any acceptable means—the power factor angle is low pass filtered by software in one exemplary embodiment. This results in a cost effective control scheme for power factor angle estimation.

The present invention described herein provides a load responsive variable speed induction motor drive system and method based on power factor angle sensing and slip control, thus maintaining near constant speed regulation without the use of a tachometer. Varying the input winding voltage helps in the efficient operation of the motor and also in maintaining control over the slip of the motor. Additional compensation to the frequency of the input motor voltage enables near constant slip for a varying load on the motor shaft.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for controlling an induction motor, the motor having a rotor and a stator including a plurality of phase windings therein to which AC voltage having a desired magnitude is applied to cause rotation of the rotor relative to the stator, the method comprising:

sensing a zero-cross angle of a current waveform applied to the phase windings;

computing the difference between the sensed current zero-cross angle and a predetermined demand voltage angle to estimate a power factor angle;

comparing the estimated power factor angle to a predetermined desired power factor angle; and adjusting the magnitude of the voltage applied to the phase windings in response to the difference between the estimated power factor angle and the predetermined desired power factor angle.

2. The method of claim 1, further comprising adjusting the frequency of the voltage applied to the phase windings in response to the difference between the estimated power factor angle and the desired power factor angle to maintain near constant speed.

3. The method of claim 1, wherein sensing the zero-cross angle of the current waveform applied to the phase windings comprises sensing the zero-cross angle of the current waveform applied to one of the plurality of phase windings.

4. The method of claim 1, wherein adjusting the voltage applied to the phase windings includes applying the difference between the estimated power factor angle and the predetermined desired power factor angle to a PID controller that provides a voltage compensation signal as an output.

5. The method of claim 4, further comprising limiting the output from the PID controller to a predetermined range.

6. The method of claim 1, wherein the predetermined command voltage is selected from a predefined volts per hertz schedule.

7. The method of claim 1, wherein an inverter applies the AC power to the phase windings, the inverter having a DC bus and including a plurality of inverter legs, each leg including first and second switching devices connected between the DC bus, and wherein sensing the zero-cross angle of the current waveform applied to the phase windings includes:

connecting a resistor between one of the first and second switching devices of at least one of the plurality of inverter legs and the DC bus; and sensing a current signal from the resistor.

8. The method of claim 7, further comprising conditioning the sensed current signal to provide an interrupt signal to a controller to determine the current zero-cross angle.

9. The method of claim 7, wherein the switching devices are driven by a PWM signal.

10. An induction motor system, comprising:

a stator;

a rotor situated relative to the stator to rotate relative to the stator;

a plurality of phase windings situated within the stator;

a power source connected to the windings to output AC voltage having a desired magnitude thereto;

a controller connected to the power source, the controller comparing a sensed current zero-cross angle to a predetermined demand voltage angle to estimate a power factor angle, and adjust the magnitude of the voltage applied to the windings in response to the difference between the estimated power factor angle and a predetermined desired power factor angle.

11. The induction motor system of claim 10, wherein the controller further adjusts the frequency of the voltage applied to the windings in response to the difference between the estimated power factor angle and the predetermined desired power factor angle.

12. The induction motor system of claim 10, wherein the power source includes an inverter having a plurality of inverter legs, each inverter leg including first and second switching devices connected between lines of a DC bus.

13. The induction motor system of claim 12, further comprising:

a resistor connected between one of the first and second switching devices and one line of the DC bus; and a current zero-cross detection circuit connected to receive a signal from the resistor and output an indication of the current zero crossing to the controller.

14. The induction motor system of claim 10, wherein the controller comprises a DSP.

15. A control system for energizing phase windings of an induction motor with a voltage having a desired magnitude, the induction motor having a rotor and a stator, the control system comprising:

a zero-cross angle detection circuit outputting a signal representing a zero-cross instant of a current waveform applied to the phase windings; and a processor connected to the zero-cross angle sensing circuit to receive the output therefrom, the processor storing signals representing a predetermined demand voltage angle and a predetermined power factor angle, the processor being programmed to:

compute the difference between the current zero-cross angle and the predetermined demand voltage angle to estimate a power factor angle; and adjust the magnitude of the voltage applied to the phase windings in response to the difference between the estimated power factor angle and the desired power factor angle.

16. The control system of claim 15, wherein the processor further adjusts the frequency of the voltage applied to the windings in response to the difference between the estimated power factor angle and the predetermined desired power factor angle.

17. The control system of claim 15, further comprising an inverter having a plurality of inverter legs, each inverter leg having an output connected to a respective one of the phase windings, wherein the zero-cross angle detection circuit is connected to at least one of the inverter legs.

18. The control system of claim 17, wherein each leg of the inverter is connected between lines of a DC bus, the system further comprising at least one resistor connected between at least one inverter leg and one line of the DC bus, the zero-cross detection circuit having an input connected between the inverter leg and the resistor.

19. An induction motor system, comprising:

a stator;

a rotor situated relative to the stator to rotate relative to the stator, a plurality of phase windings situated within the stator;

a power source connected to the windings to output an AC voltage having a desired magnitude thereto;

first means for sensing a zero-cross angle of the AC voltage applied to the windings; and second means for comparing the sensed zero-cross angle to a predetermined demand voltage angle to estimate a power factor angle, comparing the estimated power factor angle to a predetermined desired power factor angle, and in response thereto, adjusting the magnitude of the voltage applied to the windings.

20. The induction motor system of claim 19, wherein the second means further adjusts the frequency of the voltage applied to the phase windings in response to the difference between the estimated power factor angle and the desired power factor angle to maintain near constant speed.

* * * * *